US011005779B2

(12) United States Patent
Volkov et al.

(10) Patent No.: US 11,005,779 B2
(45) Date of Patent: May 11, 2021

(54) METHOD OF AND SERVER FOR DETECTING ASSOCIATED WEB RESOURCES

(71) Applicant: TRUST LTD., Moscow (RU)

(72) Inventors: Dmitry Aleksandrovich Volkov, Moscow (RU); Philipp Alekseevich Mileshin, Moscow (RU)

(73) Assignee: TRUST LTD., Moscow (RU)

( * ) Notice: Subject to any disclaimer, the term of this patent is extended or adjusted under 35 U.S.C. 154(b) by 0 days.

(21) Appl. No.: 16/270,341

(22) Filed: Feb. 7, 2019

(65) Prior Publication Data

US 2019/0253366 A1    Aug. 15, 2019

(30) Foreign Application Priority Data

Feb. 13, 2018  (RU) .......................... RU2018105377

(51) Int. Cl.
*G06F 15/16* (2006.01)
*H04L 12/911* (2013.01)
(Continued)

(52) U.S. Cl.
CPC ........... *H04L 47/822* (2013.01); *G06N 20/00* (2019.01); *H04L 41/12* (2013.01); *H04L 41/145* (2013.01);
(Continued)

(58) Field of Classification Search
CPC ..... H04L 47/822; H04L 41/12; H04L 41/145; H04L 43/045; H04L 47/826; H04L 63/00; G06N 20/00
(Continued)

(56) References Cited

U.S. PATENT DOCUMENTS 7,225,343 B1    5/2007 Honig et al.
7,496,628 B2    2/2009 Arnold et al.
(Continued)

FOREIGN PATENT DOCUMENTS

CN    103491205 A    1/2014
CN    104504307 A    4/2015
(Continued)

OTHER PUBLICATIONS

Notice of Allowance with regard to the counterpart U.S. Appl. No. 15/707,641 dated Oct. 30, 2019.
(Continued)

*Primary Examiner* — David R Lazaro
*Assistant Examiner* — Mariegeorges A Henry
(74) *Attorney, Agent, or Firm* — BCF LLP

(57) ABSTRACT

A method of determining associated network resources from a plurality of network resources available on a network, the method executable by a server that is communicatively coupled to the network. The method comprises: scanning, by the server, the network to identify a first network resource and a second network resource of the plurality of network resources; retrieving, by the server, information associated with the first network resource and the second network resource, the information comprising at least one parameter of the first network resource and at least one parameter of the second network resource; in response to a match between the at least one parameter of the first network resource and at least one parameter of the second network resource, determining a connection between the first network resource and the second network resource.

12 Claims, 12 Drawing Sheets

(51) Int. Cl.
  *G06N 20/00* (2019.01)
  *H04L 12/24* (2006.01)
  *H04L 12/26* (2006.01)
  *H04L 29/06* (2006.01)

(52) U.S. Cl.
  CPC .......... *H04L 43/045* (2013.01); *H04L 47/826* (2013.01); *H04L 63/00* (2013.01); *H04L 41/16* (2013.01)

(58) Field of Classification Search
  USPC .............................. 709/206, 224; 726/23, 25
  See application file for complete search history.

(56) References Cited

U.S. PATENT DOCUMENTS

| | | | |
|---|---|---|---|
| 7,712,136 | B2 | 5/2010 | Sprosts et al. |
| 7,730,040 | B2 | 6/2010 | Reasor et al. |
| 7,865,953 | B1 | 1/2011 | Hsieh et al. |
| 7,926,113 | B1 | 4/2011 | Gula et al. |
| 7,958,555 | B1 | 6/2011 | Chen et al. |
| 7,984,500 | B1 | 7/2011 | Khanna et al. |
| 8,132,250 | B2 | 3/2012 | Judge et al. |
| 8,151,341 | B1 | 4/2012 | Gudov |
| 8,255,532 | B2* | 8/2012 | Smith-Mickelson ........................ H04L 43/00 702/182 |
| 8,260,914 | B1 | 9/2012 | Ranjan |
| 8,285,830 | B1 | 10/2012 | Stout et al. |
| 8,402,543 | B1 | 3/2013 | Ranjan et al. |
| 8,448,245 | B2 | 5/2013 | Banerjee et al. |
| 8,532,382 | B1 | 9/2013 | Ioffe |
| 8,539,582 | B1 | 9/2013 | Aziz et al. |
| 8,555,388 | B1 | 10/2013 | Wang et al. |
| 8,561,177 | B1 | 10/2013 | Aziz et al. |
| 8,600,993 | B1 | 12/2013 | Gupta et al. |
| 8,612,463 | B2 | 12/2013 | Brdiczka et al. |
| 8,625,033 | B1 | 1/2014 | Marwood et al. |
| 8,635,696 | B1 | 1/2014 | Aziz |
| 8,650,080 | B2 | 2/2014 | O'Connell et al. |
| 8,660,296 | B1 | 2/2014 | Ioffe |
| 8,677,472 | B1 | 3/2014 | Dotan et al. |
| 8,776,229 | B1 | 7/2014 | Aziz |
| 8,839,441 | B2 | 9/2014 | Saxena et al. |
| 8,850,571 | B2 | 9/2014 | Staniford et al. |
| 8,856,937 | B1 | 10/2014 | Wüest et al. |
| 8,972,412 | B1* | 3/2015 | Christian ............ G06F 16/9558 707/748 |
| 8,984,640 | B1 | 3/2015 | Emigh et al. |
| 9,026,840 | B1 | 5/2015 | Kim |
| 9,060,018 | B1 | 6/2015 | Yu et al. |
| 9,210,111 | B2 | 12/2015 | Chasin et al. |
| 9,215,239 | B1 | 12/2015 | Wang et al. |
| 9,253,208 | B1 | 2/2016 | Koshelev |
| 9,292,691 | B1 | 3/2016 | Hittel |
| 9,330,258 | B1 | 5/2016 | Satish et al. |
| 9,338,181 | B1 | 5/2016 | Burns et al. |
| 9,357,469 | B2* | 5/2016 | Smith .................... H04M 15/60 |
| 9,456,000 | B1 | 9/2016 | Spiro et al. |
| 9,654,593 | B2* | 5/2017 | Garg .................... H04L 67/306 |
| 9,723,344 | B1 | 8/2017 | Granström et al. |
| 9,736,178 | B1 | 8/2017 | Ashley |
| 9,917,852 | B1 | 3/2018 | Xu et al. |
| 9,934,376 | B1 | 4/2018 | Ismael |
| 10,110,601 | B1 | 10/2018 | Jakobsson et al. |
| 10,212,175 | B2 | 2/2019 | Seul et al. |
| 10,440,050 | B1 | 10/2019 | Neel et al. |
| 10,462,169 | B2* | 10/2019 | Joseph Durairaj ... G06F 21/552 |
| 2002/0161862 | A1 | 10/2002 | Horvitz |
| 2003/0009696 | A1 | 1/2003 | Bunker et al. |
| 2003/0028803 | A1 | 2/2003 | Bunker et al. |
| 2004/0193918 | A1 | 9/2004 | Green et al. |
| 2006/0074858 | A1 | 4/2006 | Etzold et al. |
| 2006/0107321 | A1 | 5/2006 | Tzadikario |
| 2006/0224898 | A1 | 10/2006 | Ahmed |
| 2006/0253582 | A1* | 11/2006 | Dixon ................... G06F 16/951 709/225 |
| 2007/0019543 | A1 | 1/2007 | Wei et al. |
| 2007/0239999 | A1 | 10/2007 | Honig et al. |
| 2008/0295173 | A1 | 11/2008 | Tsvetanov |
| 2009/0077383 | A1 | 3/2009 | De Monseignat et al. |
| 2009/0138342 | A1 | 5/2009 | Otto et al. |
| 2009/0281852 | A1* | 11/2009 | Abhari ............... G06Q 30/0214 705/14.16 |
| 2009/0292925 | A1 | 11/2009 | Meisel |
| 2010/0011124 | A1 | 1/2010 | Wei et al. |
| 2010/0037314 | A1 | 2/2010 | Perdisci et al. |
| 2010/0076857 | A1 | 3/2010 | Deo et al. |
| 2010/0115620 | A1 | 5/2010 | Alme |
| 2010/0115621 | A1 | 5/2010 | Staniford et al. |
| 2010/0191737 | A1 | 7/2010 | Friedman et al. |
| 2010/0205665 | A1 | 8/2010 | Komili et al. |
| 2010/0228731 | A1* | 9/2010 | Gollapudi ............. G06F 16/955 707/737 |
| 2010/0235918 | A1 | 9/2010 | Mizrahi et al. |
| 2011/0016533 | A1 | 1/2011 | Zeigler et al. |
| 2011/0222787 | A1 | 9/2011 | Thiemert et al. |
| 2012/0030293 | A1 | 2/2012 | Bobotek |
| 2012/0079596 | A1 | 3/2012 | Thomas et al. |
| 2012/0087583 | A1 | 4/2012 | Yang et al. |
| 2012/0158626 | A1 | 6/2012 | Zhu et al. |
| 2012/0233656 | A1 | 9/2012 | Rieschick et al. |
| 2012/0291125 | A1 | 11/2012 | Maria |
| 2013/0086677 | A1 | 4/2013 | Ma et al. |
| 2013/0103666 | A1 | 4/2013 | Sandberg et al. |
| 2013/0111591 | A1 | 5/2013 | Topan et al. |
| 2013/0117848 | A1 | 5/2013 | Golshan et al. |
| 2013/0191364 | A1 | 7/2013 | Kamel et al. |
| 2013/0263264 | A1 | 10/2013 | Klein et al. |
| 2013/0297619 | A1 | 11/2013 | Chandrasekaran et al. |
| 2013/0340080 | A1 | 12/2013 | Gostev et al. |
| 2014/0033307 | A1 | 1/2014 | Schmidtler |
| 2014/0058854 | A1 | 2/2014 | Ranganath et al. |
| 2014/0082730 | A1 | 3/2014 | Vashist et al. |
| 2014/0173287 | A1 | 6/2014 | Mizunuma |
| 2014/0250145 | A1* | 9/2014 | Jones .................. G06F 16/3329 707/769 |
| 2014/0310811 | A1 | 10/2014 | Hentunen |
| 2014/0317754 | A1 | 10/2014 | Niemela et al. |
| 2014/0380480 | A1 | 12/2014 | Tang |
| 2015/0007250 | A1 | 1/2015 | Dicato, Jr. et al. |
| 2015/0049547 | A1 | 2/2015 | Kim |
| 2015/0067839 | A1 | 3/2015 | Wardman et al. |
| 2015/0163242 | A1 | 6/2015 | Laidlaw et al. |
| 2015/0170312 | A1 | 6/2015 | Mehta et al. |
| 2015/0200962 | A1* | 7/2015 | Xu ........................ G06F 21/566 726/23 |
| 2015/0200963 | A1 | 7/2015 | Geng et al. |
| 2015/0220735 | A1 | 8/2015 | Paithane et al. |
| 2015/0295495 | A1 | 10/2015 | Canzanese et al. |
| 2015/0363791 | A1 | 12/2015 | Raz et al. |
| 2015/0381654 | A1 | 12/2015 | Wang et al. |
| 2016/0036837 | A1 | 2/2016 | Jain et al. |
| 2016/0036838 | A1 | 2/2016 | Jain et al. |
| 2016/0044054 | A1 | 2/2016 | Stiansen et al. |
| 2016/0055490 | A1 | 2/2016 | Keren et al. |
| 2016/0065595 | A1 | 3/2016 | Kim et al. |
| 2016/0080410 | A1* | 3/2016 | Gorny .................... H04L 63/101 726/25 |
| 2016/0112445 | A1 | 4/2016 | Abramowitz |
| 2016/0127907 | A1 | 5/2016 | Baxley et al. |
| 2016/0142429 | A1 | 5/2016 | Renteria |
| 2016/0149943 | A1 | 5/2016 | Kaloroumakis et al. |
| 2016/0191243 | A1 | 6/2016 | Manning |
| 2016/0205122 | A1 | 7/2016 | Bassett |
| 2016/0205123 | A1 | 7/2016 | Almurayh et al. |
| 2016/0226894 | A1 | 8/2016 | Lee et al. |
| 2016/0253679 | A1 | 9/2016 | Venkatraman et al. |
| 2016/0261628 | A1 | 9/2016 | Doron et al. |
| 2016/0267179 | A1 | 9/2016 | Mei et al. |
| 2016/0285907 | A1 | 9/2016 | Nguyen et al. |
| 2016/0306974 | A1 | 10/2016 | Turgeman et al. |
| 2016/0359679 | A1 | 12/2016 | Parandehgheibi et al. |
| 2017/0034211 | A1 | 2/2017 | Buergi et al. |

(56) References Cited

U.S. PATENT DOCUMENTS

| | | |
|---|---|---|
| 2017/0078321 A1 | 3/2017 | Maylor et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0264627 A1* | 9/2017 | Hunt .................... G06F 21/577 |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0152471 A1 | 5/2018 | Jakobsson |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0207973 A1 | 7/2019 | Peng |
| 2019/0373005 A1 | 12/2019 | Bassett |
| 2020/0134702 A1 | 4/2020 | Li |

FOREIGN PATENT DOCUMENTS

| | | |
|---|---|---|
| CN | 105429955 A | 3/2016 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |
| WO | 2019/153384 A1 | 8/2019 |

OTHER PUBLICATIONS

Whyte, "DNS-based Detection of Scanning Worms in an Enterprise Network", Aug. 2004, NOSS, pp. 1-17 (Year: 2005)—cited in the Notice of Allowance with regard to the counterpart U.S. Appl. No. 15/707,641.
English Translation of CN106713312, ©Questel—FAMPAT, Jul. 17, 2019.
English Translation of CN105897714, ©Questel—FAMPAT, Jul. 17, 2019.
English Translation of CN106506435, ©Questel—FAMPAT, Jul. 26, 2019.
English Translation of CN107392456, ©Questel—FAMPAT, Jul. 29, 2019.
English Translation of CN103491205, ©Questel—FAMPAT, Jul. 29, 2019.
English Translation of CN106131016, ©Questel—FAMPAT, Jul. 17, 2019.
Invitation to Respond to Written Opinion with regard to the counterpart SG Patent Application No. 10201900339Q.
Invitation to Respond to Written Opinion with regard to the counterpart SG Patent Application No. 10201901079U.
Invitation to Respond to Written Opinion received Jul. 31, 2019 with regard to the counterpart SG Patent Application No. 10201900335P.
Office Action with regard to the counterpart U.S. Appl. No. 16/261,854 dated Oct. 21, 2019.
Office Action with regard to the counterpart U.S. Appl. No. 15/858,013 dated Nov. 22, 2019.
Office Action with regard to the counterpart U.S. Appl. No. 15/707,641 dated Apr. 25, 2019.
Notice of Allowance with regard to the counterpart U.S. Appl. No. 15/858,013 dated May 8, 2020.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, p. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.

(56) References Cited

OTHER PUBLICATIONS

International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Office Action received with regard to the counterpart U.S. Appl. No. 15/858,032 dated Apr. 6, 2020.
Notice of Allowance with regard to the counterpart U.S. Appl. No. 15/858,013 dated Jun. 10, 2020.
English Abstract for CN105429955 retrieved on Espacenet on Jul. 13, 2020.
Search Report with regard to the RU Patent Application No. 2019142440 completed Oct. 26, 2020.
Notice of Allowance with regard to the counterpart U.S. Appl. No. 16/239,605 dated Jan. 25, 2021.

* cited by examiner

| 202 | 204 | 206 | 208 | 210 | 212 | 214 | 216 | 218 |
|---|---|---|---|---|---|---|---|---|
| Abc.com | 282.8.16.142 | Ae7c42 E5843f 1b2ef1 F7363d 27df1a B0f7bo 1111 | .... | Online-banking | Acd.com Add.com Bck.de | 217.18.2.25 | 211.162.78.1 | Ivanov Petrov |
| | | | | | | | | .... |

METHOD OF AND SERVER FOR DETECTING ASSOCIATED WEB RESOURCES

CROSS-REFERENCE

The present application claims convention priority to Russian Utility Patent Application No. 2018105377, filed on Feb. 13, 2018, entitled "METHOD OF AND SERVER FOR DETECTING ASSOCIATED WEB RESOURCES", the entirety of which is incorporated herein by reference.

TECHNICAL FIELD

The non-limiting embodiments of the present technology relate to the field of network technologies in general, and more specifically, to a method of and a server for detecting associated network resources, in even more particularly, to detection of potentially malicious network resources.

BACKGROUND

One of examples of an area where searching for associated objects in a network can be useful is searching for malicious infrastructure detection, used by malicious individuals (such as intruders). There are many ways of the intruder's host concealment: use of "hacked" routers, proxy servers layered systems, malicious data transmission channel encryption, malicious data encryption, tunneling and others. That is why effective and versatile cyber security tools are necessary, allowing for quick detection of an object associated with a network infrastructure of interest.

Connection between the network resources can be detected by their unique identifiers. One example of such identifiers is a cryptographic protocol. They are widely used protecting data transmitted by various networks and provide the data source, data transmission parties authentication functions, data confidentiality and integrity, impossibility of access denial and privileges. One of approaches to the botnets concealed nodes is based on the assumption that the intruders use the standard cryptographic protocols. Such protocols are implemented above any other application level protocol.

The SSL and SSH cryptographic protocols are widely used these days, often used together with the HTTP protocol. These protocols are configured to establish secure communication channel for confidential or sensitive information transmission. Both protocols use the Public Key Infrastructure—set of tools, distributed services and components cumulatively used for private and public keys based cryptotasks supporting.

The SSH (Secure Shell) protocol allows to establish a secure communication channel for the remote authentication using the login and password for secure transmission of data. The SSH protocol can provide the client authentication by the client's IP-address, by the client's public key or by the password entry. After passing the authentication by one of methods from available at the client and the server pairs of keys the symmetrical encryption key is generated. All subsequent transmitted via the SSH data are encrypted with this key.

The SSL (Secure Sockets Layer) protocol provides the data protection during their transmission in the network. The SSL-certificate includes information about the key owner, certification center, public key and other information. The server and the client certification process includes at least exchange of handshake messages, containing data on the protocol version, session identifier, encryption and compression method, the certificate and key sending to the client. Together with the key, a key fingerprint is transmitted, the key identifier, which uniquely determines the matched keys pair. The fingerprint may be, for example, calculated based on the public key the hash function value.

For using the SSL/SSH certificates based data transmission organizations, the authentication keys change is quite resource-intensive, since it involves the large number of manually performed operations. Coding proprietary cryptographic protocols (i.e. those different from the issued by the certificate authorities) is a difficult task. The proprietary cryptographic protocols often contain large number of vulnerabilities and errors. Thus, many organizations use the same certificates issued by the certification center certificates for a long time.

SUMMARY

Non-limiting embodiments of the present technology are based on a premise that the unique identifiers allow to find connections between the network resources. In accordance with the non-limiting embodiments of the present technology, the identifiers are used as the parameters for determining of connections between the network resources, that is, for the interconnected network resources searching.

The interconnected network resources can also be identified by means of domain name registration data, IP-addresses changing history, running services, domain names history, DNS-servers' history, DNS-records changing history and other parameters comparison. The network resources matching allows determining connections between the network resources, wherein one resource may be associated with other resources by one or more parameters. This allows to solve the following tasks: identification of the botnets, identification of connection between the servers, or determining connections between two network resources. Thus, the present technology is relevant not only to the network resources harmfulness determining, but also to the network resources affiliation determination, for example, for connection between the two companies' determination based on connections between their network resources.

The non-limiting embodiments of the present technology are directed to a method that enables detection of the network infrastructure interconnected objects based on the information about at least one of the said infrastructure objects.

Technical result of at least some of the non-limiting embodiments of the present technology is increase in the interconnected network resources searching accuracy and improvement in the computation speed. In some of its embodiments the technical solution also allows to eliminate several drawbacks of the known solutions.

In accordance with a first broad aspect of the present technology, there is provided a method of determining associated network resources from a plurality of network resources available on a network, the method executable by a server that is communicatively coupled to the network. The method comprises: scanning, by the server, the network to identify a first network resource and a second network resource of the plurality of network resources; retrieving, by the server, information associated with the first network resource and the second network resource, the information comprising at least one parameter of the first network resource and at least one parameter of the second network resource; in response to a match between the at least one parameter of the first network resource and at least one parameter of the second network resource, determining a connection between the first network resource and the second network resource.

In some implementations of the method, the method further comprises evaluating an actual time interval as the network resource parameter.

In some implementations of the method, the scanning the network is further to identify a third network resource; the retrieving the information further comprises retrieving the information about the third network resource, the information including at least one parameter of the third network resource; in response to matching at least one parameter of the first network resource and at least one parameter of the second network resource, and at least one parameter of the second network resource and at least one parameter of the third network resource, the method further comprises establishing the connection between the first network resource and the third network resource.

In some implementations of the method, the method further comprises: obtaining additional information about the first network resource and the second network resource from a history database; and wherein the match is further based on comparison of the additional information from the history database and the at least one parameter of the first network resource and at least one parameter of the second network resource is compared.

In some implementations of the method, at least one parameter comprises at least one of: a domain name, an IP-address, an SSL-key, an SSH-fingerprint, an executable file, information about running services, a domain name owner data, an IP-address owner data, an e-mail address, resource owner contact information.

In some implementations of the method, the at least one parameter has at least one value.

In some implementations of the method, the determining the connection between the first network resource and the second network resource comprises applying a mathematical model in a form of a graph, graph vertices corresponding to the first network resource and to the second network resource, and graph edges representing connections between the first network resource and the second network resource by at least one parameter, which is common to the first network resource and the second network resource.

In some implementations of the method, the method further comprises setting a connections number threshold value representative of a threshold value of connections by a single network resource parameter between a given first network resource and a given second network resource.

In some implementations of the method, the method further comprises assigning weights to the connections between the first network resource and the second network resource based on the at least one parameter of the first network resource parameter and the second network resource.

In some implementations of the method, the method further comprises determining a connection factor as a ratio of (i) a number of connections by one parameter between the first network resource and the second network resources, and (ii) each connection weight by one parameter between the first network resource and the second network resource.

In some implementations of the method, the connections number threshold value is set by the user.

In some implementations of the method, the connection weight is assigned by the user.

In some implementations of the method, the connections number threshold value is set using a machine learning algorithm.

In some implementations of the method, the connection weight is assigned using a machine learning algorithm.

In some implementations of the method, the assigning the connection weight further comprises considering date and time, associated with at least part of the information about a target network resources.

In some implementations of the method, the method further comprises ignoring connections between the first network resource and the second network resource based on at least one of: the connection factor, and the weights.

In some implementations of the method, the method further comprises ignoring the connections between the first network resource and the second network resource if the connections number threshold value is exceeded by one network resource parameter between one first network resource and the second network resources.

In accordance with another broad aspect of the present technology, there is provided a method of determining associated network resources to a target network resource, the associated network resources from a plurality of network resources available on a network, the method executable by a server that is communicatively coupled to the network. The method comprises: obtaining an indication of the target network resource; retrieving information associated with the target network resource, the information including at least one parameter associated with the target network resource; scanning the network in order to identify candidate associated resources for the target network resource, the candidate associated resources including a first network resource and second network resource; retrieving information associated with the first network resource and the second network resource, the information including at least one parameter of the first network resource and at least one parameter the second network resource; in response to at least one parameter of the target network resource matching at least one parameter of the first and the second network resource, establishing connection between the target network resource and a respective one of at least one of a the first and the second network resource.

In some implementations of the method, the method further comprising, in response to the at least one parameter of the first network resource matching the at least one parameter of the second network resource, further establishing connection between the first network resource and the second network resource.

In accordance with yet another broad aspect, there is provided a server for a determining associated network resources, the server configured to connect to a database via a data transmission network, the server comprising: a data transmission interface for data exchange via the data transmission network; a memory storing machine readable instructions; a processor, functionally coupled to the data transmission interface and the memory, wherein the processor is configured to implement the methods disclosed herein.

For the purposes of the present disclosure, unless specifically indicated otherwise, the words "first", "second", etc. are used in the form of adjectives exclusively to distinguish nouns, to which they relate, but not for the purpose of any specific interconnection between these nouns description.

For the purposes of the present disclosure, the "network resource" term means a global network element or elements combination, which potentially can be accessed by the Internet. It is noted that even in the case of the element storage in an encrypted form and on the access-restricted server, the element is deemed to be potentially accessible. For the purposes of the present disclosure, the "network resource" implies any data or data set, which can be presented by the publisher via the network, and which are associated with the network resource address. Not limiting examples of network resources are the HTML pages, documents, images, video, news feeds, or pluralities of the abovementioned files. Network resources can include content, such as words, phrases, images, etc., and/or embedded information, for example, metadata, hyperlinks and/or embedded instructions (for example, the JavaScript scenarios).

For the purposes of the present disclosure, unless otherwise is clearly indicated, the "machine-readable medium" and "memory" mean medium of absolutely any kind and nature. Non-restrictive examples include the RAM, ROM, discs (compact discs, DVD-discs, floppy discs, hard drives, etc.), USB-dongles, memory cards, solid state drives and magnetic tape drives.

For the purposes of the present disclosure, the "server" means a computer device executing appropriate software, which can receive requests (for example, from client devices) via the network, and execute these requests, or initiate these requests execution. The hardware may represent one computer or a computer system. For the purposes of the present technique, use of the "server" statement does not mean that any task or any specific task will be received, executed or initiated for execution by the same server (that is, the same software and/or hardware); this means that into the reception/transmission, execution or the execution initiation of associated with the client device any request or any request consequences any number of software components or hardware devices may be involved, and all this software and hardware may be one server or several servers, the "server" statement includes both versions. The server functions may also be implemented in the client device, in particular, in that case, if the said client device is connected to another client device.

For the purposes of the present disclosure, unless specifically indicated otherwise, the "client device" means electronic device associated with the user, and including any hardware, capable of operating with software appropriate for the corresponding task solving. Thus, as examples of the client devices, among other, may serve the personal computers (desktop computers, laptops, netbooks, etc.), smartphones, tablet computers, as well as the network equipment, such as routers, switches and gateway computers. It is necessary to bear in mind that in the present context acting like the client device computer device may act like a server with respect to the other client devices. Using the "client device" statement does not exclude the plurality of client devices usage for any task or request, or any task or request consequences, or the above described method any steps reception/sending, execution or the execution initiation.

For the purposes of the present disclosure, unless specifically indicated otherwise, the "information" includes any information of any kind, including information, which can be stored in the database. Thus, the information, among other things, includes data (addresses, identifiers, encryption keys, etc.), data change history, documents, tables, etc.

BRIEF DESCRIPTION OF DRAWINGS

For better understanding of the present technology as well as its aspects and features, the following description with references to the enclosed drawings is provided, where:

FIG. 2 depicts a database hosting information about network resources, the database implemented according to one non-limiting embodiment of the present technical solution;

DETAILED DESCRIPTION OF THE NON-LIMITING EMBODIMENTS

The following description is presented only to illustrate non-limiting embodiments of the present technology. This description is not intended to delimit the present technology or define its scope.

Some useful examples to modify the described method and the system that determines the related network resources may also be covered by the following description. Its purpose is also solely to help in understanding, but not to determine the scope and boundaries of this technology. These modifications are not an exhaustive list, and those skilled in the art will understand that other modifications are possible. In addition, it should not be interpreted so that where it has not yet been done, i.e. where no modification examples have been provided, no modifications are possible and/or something described here is the only embodiment of this element of the present technology. As it will be clear to a person skilled in the art, this is most likely not the case. In addition, it should be keep in mind that, in some specific cases, the method and system to determine the related network resources are fairly simple embodiments of the present technology, and in such cases they are presented here in order to facilitate understanding. As it will be clear to a person skilled in the art, many embodiments of the present technology will be much more complex.

The non-limiting embodiments of the present technology are aimed at detecting interconnected network resources.

Figure 1:
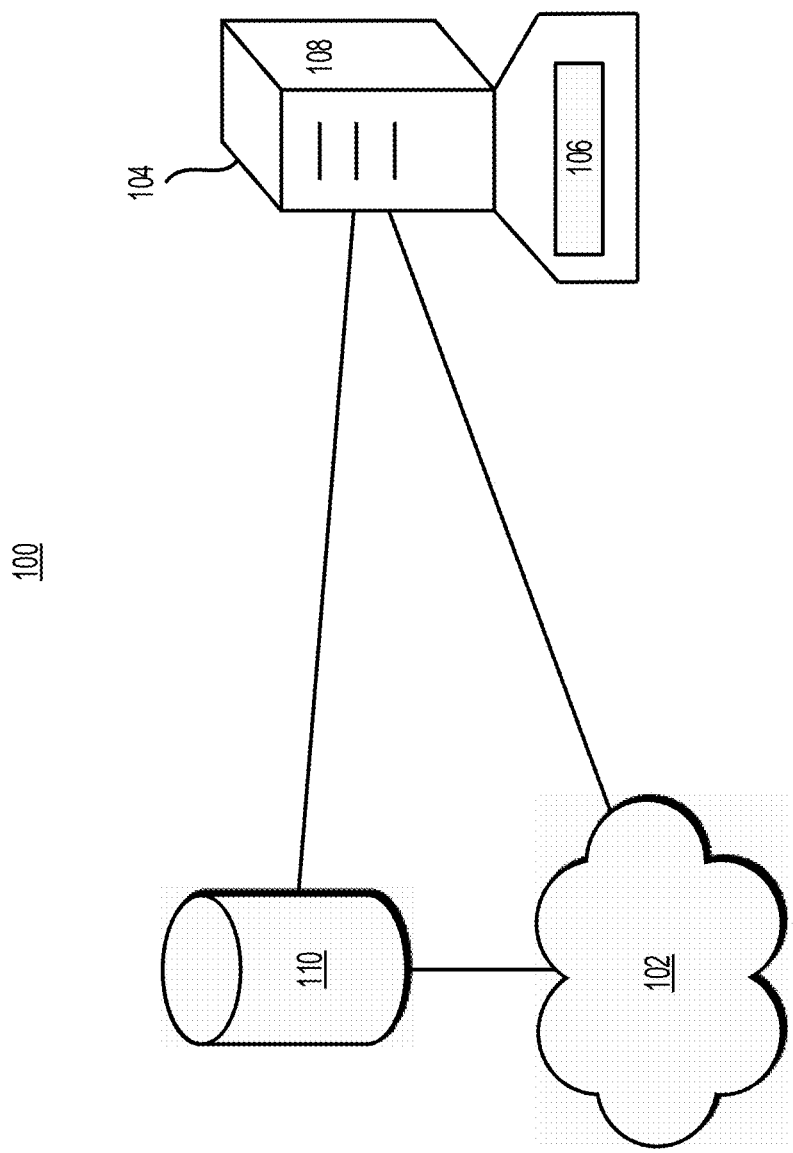
FIG. 1 depicts a system according to one non-limiting embodiment of the present technical solution.

FIG. 1 depicts a scanning system 100, the system 100 being implemented according to one non-restrictive embodiment of the present technology. In some non-limiting embodiments of the present technology, the scanning system 100 may comprise a data transmission network 102, a server 104 and a database 110.

The data transmission network 102 may be implemented, for example, as the Internet or any other data-processing network.

In another non-limiting embodiment of the present technology, the scanning system 100 may further comprise active network equipment (not shown) and a client device (not shown). As the active network equipment, for example, routers, switches and gateways may be used.

In one non-limiting embodiment of the present technology, the at least one server 104 is an example of a hardware that is configured to implement a function of at least one target network resource.

The server 104 is configured to implement a web robot 106 (or a crawler"), performing the network resources scanning function. The server 104 may further comprise a task planner (not shown), as well as a network scanning conditions list (not shown).

The server 104 is configured to exchange data with a database 110 and a data transmission network 102. The server 104 comprises a data transmission interface for the data transmission via the data transmission network 102.

Thus, the server 104 is configured to connect to the database 110 by means of the data transmission network 102. The server 104 comprises at least the following: data transmission interface for the data exchange by means of the data transmission network 102; memory, comprising machine readable instructions; processor, functionally connected to the data transmission interface and memory. The processor is configured to store machine readable instructions, which instructions when executed cause the processor to be configured to implement: the network scanning in order to search for the network resources; the network scanning step resulting in identification of at least the first network resource and at least the second network resource; retrieval of information about the first network resource and the second network resource. The information so retrieved can include at least one parameter of the first resource and at least one parameter of the second network resource; in response to a match of the at least one parameter of the first network resource matching with at least one parameter of the second network resource, establishing connection between the first network resource and the second network resource.

In one non-limiting embodiment of the present technology the database 110 stores information associated with plurality of network resources. Additionally, or optionally, the database 110 may comprise one or more databases, wherein one or more databases may represent one or more individual databases (not shown). The individual databases may be parts of the one and the same physical database or may be implemented as the stand-alone physical units.

The system 100 is configured to transmit data between at least one server 104 and the database 110.

FIG. 2 shows one of non-limiting examples of network resources representation in the database 110. Information may be initially uploaded into the database during execution of the method described herein below. The database can also be updated from time to time. Thus, the database 110 provides for storage and updating of the information about the network resources.

Information in the database 110 may be structured in a form of a Table 200, showing interconnection between the following parameters. For example, for a given network resource each parameter, for example, the domain name 202, corresponds, for example, corresponds to at least one of the following parameters: IP-address 204, SSL-key 206, SSH-fingerprint 208, list of running servers 210, domain names history 212, IP-addresses history 214, DNS-servers' history 216, domain name or IP-address history 218. The parameters may also comprise the DNS resource records, which in the present description are also called the DNS-records, which represent records on the name and service information correspondence in the domain names system.

In one possible non-limiting embodiment of the present technology, the running servers list 210 may comprise the running services on the network resource, having the corresponding domain name 202 designation and/or IP-address 204. Also in alternative non-limiting embodiments of the present technology, the domain names history 212 may comprise any number of IP-addresses corresponding to the domain names. In an alternative non-limiting embodiment of the present technology, the IP-addresses history 214 may comprise any number of domain names corresponding to the IP-addresses. In yet further alternative non-limiting embodiments of the present technology, the DNS-servers' history 216 may comprise any number of DNS servers corresponding to the domain name 202 and/or the IP-address 204. In yet further alternative non-limiting embodiments of the present technology, the domain name or IP-address owners' history 220 may comprise a surname, a first name and a patronymic name, an e-mail, a postal address, a legal address, a registration date, date of the domain name or an indication of an IP-address transfer to another owner.

In yet further alternative non-limiting embodiments of the present technology, the information stored in the database 110 is based on the network scanning results by the domain names and IP-addresses. In yet further alternative non-limiting embodiments of the present technology, information retrieval from the database 110 is based on information about at least one specified network resource. In yet further alternative non-limiting embodiments of the present technology, the information retrieval from the database 110 may be executed as follows. Assume that the specified network resource has parameter with the IP-address 204. In this case, all the records corresponding to the said IP-address 204 are retrieved from the database 110. A similar example may be taken for the case, when the specified network resource has parameters: domain name 202, SSL-key 206, SSH-fingerprint 208, executable file, list of running servers 210, domain names history 212, IP-addresses history 214, DNS-servers' history 216, owners' history 220.

The non-limiting embodiments of the present technology are directed to obtaining information about connections between the network resources, including at least one network resource and at least another network resource from a plurality of network resources. For the purposes of the present disclosure, plurality of network resources can include network resources associated with at least one specified network resource. In one of non-limiting embodiments of the present technology, the information about at least one specified network resource may be obtained from a user. In another non-limiting embodiment of the present technology, the information about at least one specified network resource may be obtained from the database 110.

Figure 3A:
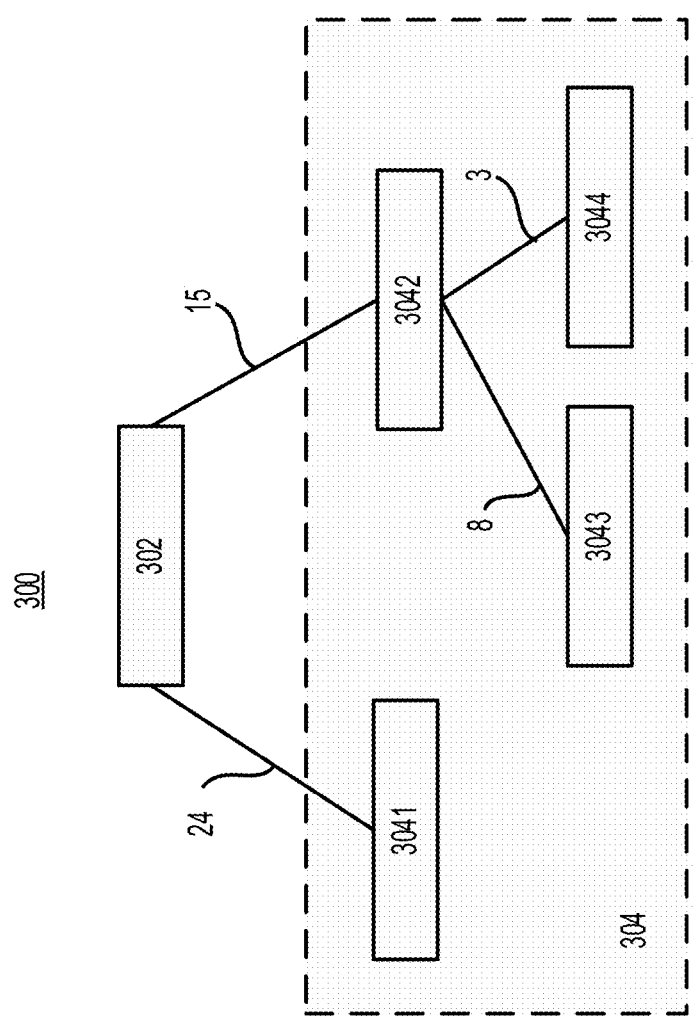
FIG. 3a depicts a graph illustrating network resources connections according to one non-limiting embodiment of the present technical solution.

FIG. 3a depicts an example of connections between the network resources using a mathematical model in the form of a graph 300. The network resources are designated as 302, 3041, 3042, 3043, 3044, and are represented as the graph vertices, and connections between the resources 302, 3041, 3042, 3043, 3044 are represented by the graph edges 302-3042, 302-3041, 3042-3043, 3042-3044. The network resources include the specified network resource 302, which is connected to the network resources 3041, 3042, 3043, 3044 based on the information retrieved during the searching. The target network resources 3041, 3042, 3043, 3044 form plurality 304. In particular, the retrieved information may be presented in the form of parameter and a weight w may be assigned depending on the parameter the connection. A value of weight w is indicated near the associated graph edge. For example, the connection 302-3042 is assigned with weight 15, the connection 3042-3043 is assigned with weight 8, the connection 3042-3044 is assigned with weight 3, and the connection 302-3041 is assigned with weight 24. Each connection is associated with at least one parameter, for example, the connection 302-3042 are associated with two common parameters, such as for example, an IP-address and a SSH-fingerprint. That connection between the resources may be represented by more than by two parameters, i.e., number of common to resources 3042-3043 parameters may be greater. A user may select the parameters independently, or the parameters may be selected using a machine learning algorithm.

In addition, parameters may have more than one value, for example, the "domain name owner contact information" parameter may further have more specific values, for example, comprise only part of the domain name owner contact information, for example, postal code or street name. At that, the connections may be determined both by the "postal code" and by the "street name" parameters. It is possible to determine connection by the "domain name owner contact information" parameter only by all the parameter values complete matching or by the parameter values matching.

Connections between the network resources may be assigned with weight, which may depend on the specific parameters. In the theory of graphs, the weight is usually a real number, which in the depicted non-limiting embodiment may be interpreted, for example, as the graph edge length. In the depicted non-limiting embodiment, the graph edge weight may also be interpreted as strength of the connection between designating the network resources graph vertices. The weights may also be selected by user, or made using the machine learning algorithm. The smaller the connection weight, the "weaker" this connection, and the smaller its value during the consideration when finding connections between the target network resources. At the same time, the connection weight may have the insignificant influence during determining connection between the network resources.

Let's take a look at Rm1, Rm3 and Rm4 (not depicted) resources subsets from plurality of resources 304. For example, connection by the "e-mail" parameter between the resource 3041 and subset Rm1 of associated thereto resources may be assigned with weight 10, connection by the "SSL-key" parameter between the resource 3043 and subset Rm3 of associated thereto resources may also be assigned with weight 10, and connection by the "IP-address" parameter between the resource 3044 and subset Rm4 of associated thereto resources may be assigned with weight 3 (See Table 1). At that, the subset Rm1 comprises 100 resources, the subset Rm3 comprises 300 resources, and the subset Rm4 comprises 10 resources. From the Table it can be seen that despite the fact, that connections by the "e-mail" and the "SSL-key" parameters may be initially assigned with relatively large weight "w", in this case, w=10 for these parameters, during the associated network resources searching method implementation many connections by these parameters may be found. If one resource is connected to the large subset of resources even by the strong parameter, this does not always mean a really strong connection. Thus, it is reasonable to introduce a connection factor K, expressing the connection weight relation to the number of resources, associated with the given network resource 302, that is, reflecting the quality to the quantity relation.

TABLE 1

| R | w | P | Rm | K |
|---|---|---|---|---|
| 3041 | 10 | "e-mail" | 100 | 10/100 = 0.1 |
| 3043 | 10 | "SSL-key" | 300 | 10/300 = 0.03 |
| 3044 | 3 | "IP-address" | 10 | 3/10 = 0.3 |

For the resource 3041 with the resources subset Rm1 the connection factor K makes 0.1. For the resource 3043 with the resources subset Rm3 the connection factor K makes 0.03. For the resource 3044 with the resources subset Rm4 the connection factor K makes 0.3. At that, having the smallest connection factor K connections may be deleted from the graph, i.e., will not be considered during the connections establishment.

Thus, the strongest connection factor was by the "IP-address" parameter, which initially was a relatively weak parameter, connection by which had the smallest weight w=3.

Additionally, the database 110 may store previous results of the network scanning. The database 110 may store the information about connections between the resources and parameters, by which these resources were connected, and about the weights assigned to these connections during previous iterations of the methods disclosed herein.

Figure 4:
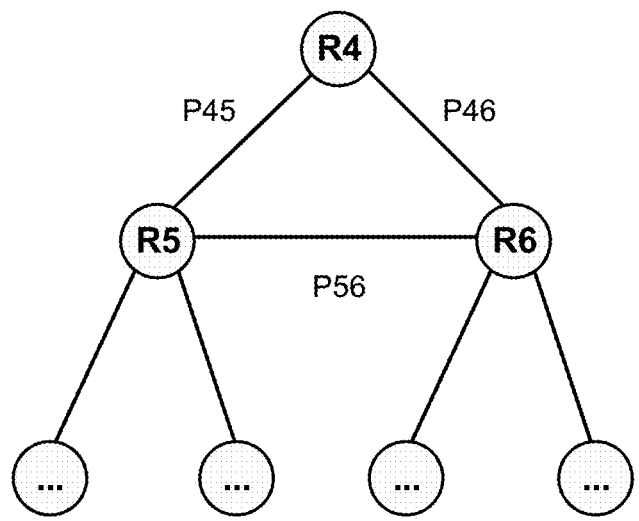
FIG. 4 depicts a graph illustrating network resources connections according to yet another non-limiting embodiment of the present technical solution.

As shown in graph 400 depicted in FIG. 4, at least one specified network resource R4 may be specified by indication of at least one of the following parameters: domain name, IP-address, SSL-key, SSH-fingerprint, information about running services, domain names history, IP-addresses history, DNS-servers' history, DNS-records changing history, executable files with network nodes interaction history, domain name owners changing history. It should be understood that number of specified network resource is not limited. In one of non-limiting implementations of the present technology, the plurality of network resources is a subset of network resources found during the network scanning.

In one of non-limiting embodiments of the present technology at least a portion of network resources from plurality of network resources 404 is directly connected to one specified network resource R4; at least the portion of network resources R5, R6 from plurality of network resources 404 is connected to each other by virtue of them being connected to the at least one network resource R4.

It should be noted that either a user or a machine learning algorithm may change the parameters and their values, as well as re-assign the connections weights depending on parameters, by which the network resources are connected, or regardless of dependence on them.

Figure 3B:
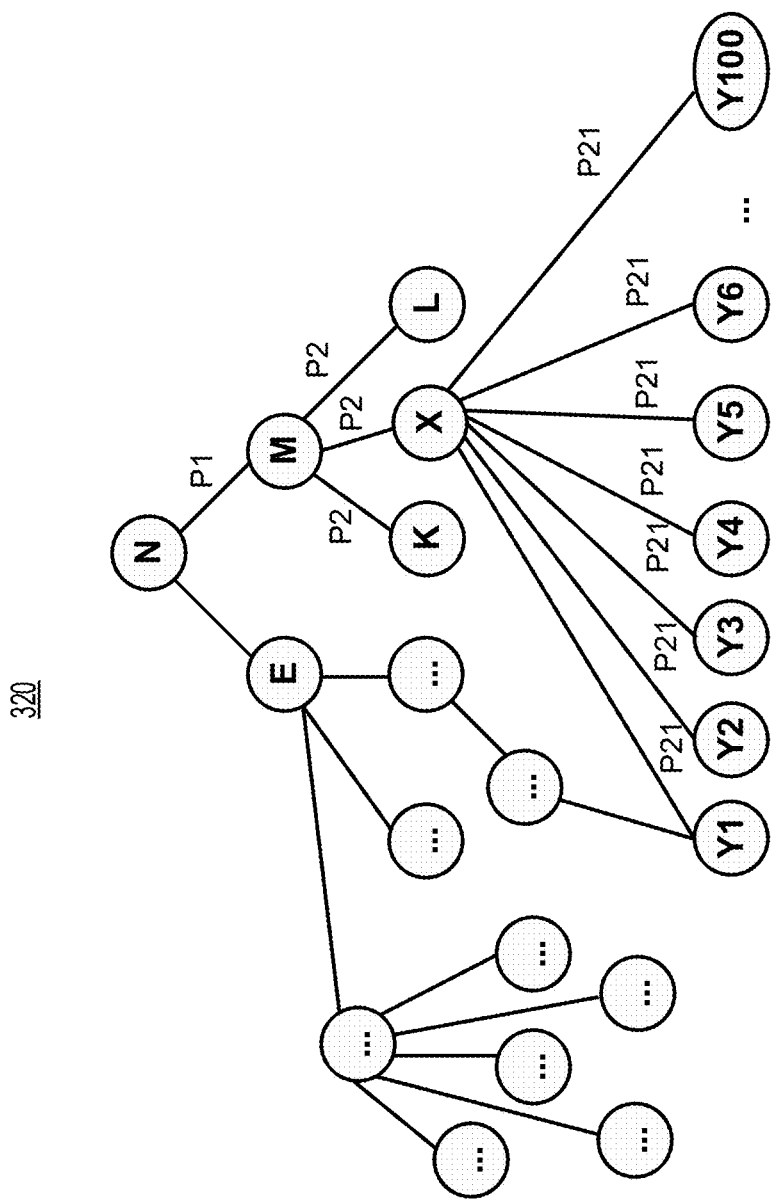
FIG. 3b depicts a graph illustrating network resources connections according to another non-limiting embodiment of the present technical solution.

FIG. 3b depicts the network resources connections in a form of a graph 320 according to another non-limiting embodiment of the present technology. This graph has several branches, for example, resource N is connected to the resource M by a P1 parameter, and resource M, in its turn, is connected to resources K, L and X by P2 parameters. The parameters may have one or more values. For example, the resource M is connected to the resources K, L and X by the P2 "domain name owner contact information" parameter, but the P2 parameter values may differ, since the domain name owner contact information values may be different, which may be expressed through plurality of the parameter values, for example, the P2 "postal address" parameter values may be the following: P21 "Baker street" and P22 "Rosedale street" (not shown).

In particular, the "domain name owner contact information" parameter may be defined broadly enough, for example, by the postal code and city selection, and this parameter values may be specified by a more specific way, for example, the streets names.

As can be appreciated from FIG. 3 *b*, that K and L resources have no connections other than to the M resource, while the X resource has plurality of connections to the Y1-Y100 resources by the P2 parameter with one value, i.e., the P21. Assume that the P21 parameter means "Place de la Concorde". Thus, the X resource is connected to the Y1-Y100 resources by one parameter P2 "domain name owner contact information" and by its value 1 "Place de la Concorde".

Thus, the resource X is connected by the P21 parameter to the plurality of connected resources Y1-Y100. These connections are not necessary relevant enough or unique. The same situation may occur in those cases, when several network resources are using the single cloud service. In such a case, parameter, by which the network resources are connected, usually is the SSL-key, that is, the SSL-key may match in many network resources if they use the cloned cloud engines. Another example may be the "e-mail address" parameter, since often during the domain names registration the domain names registrar e-mail address is reported, and the domain name owner e-mail address is not disclosed. Thus, it is possible to find many resources connected to each other by the "e-mail address" parameter, which does not point out to the actual domain names owners.

As depicted in FIG. 3 *b*, connections between the X resource and the Y1-Y100 resources are represented in large amount, and, thus, it is reasonable to delete, in other words, cut off (or "ignore") connections between the X resource and the Y1-Y100 resources by the P21 parameter.

Therefore, since it is impossible to unambiguously characterize such parameter as the suspicious one. As such, in some embodiments of the present technology in order to avoid the influence of this parameter on the network resources searching method, such an ambiguous connection between the X resource and the Y1-Y100 resources in the graph may be deleted/ignored, i.e., the methods disclosed herein may not take connections between the X resource and the Y1-Y100 into account.

In this case the connection factor K is reasonable as ratio of the number of connections by one parameter between one first network resource and the second network resources and each connection weight by one parameter between the first network resource and the second network resources; depending on the connection factor K connections between the X resource and the Y1-Y100 network resources may be deleted. Due to this, the computation time reduction and the computational resources saving is provided.

Figure 3C:
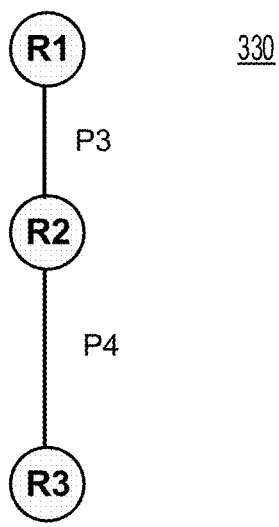
FIG. 3c depicts a graph illustrating network resources connections in the form of graph according to yet another non-limiting embodiment of the present technical solution.

FIG. 3*c* depicts the network resources connections in the form of a graph 320 according to another non-limiting embodiment of the present technology. In some cases, it is impossible to determine the direct connections between the resources. FIG. 3*c* depicts such the case. The resource R1 is connected to the resource R2 by the P3 "domain name owner" parameter, i.e., the R1 and R2 resources have common domain name owner. The R2 resource is connected to the R3 resource by the P4 "IP-address" parameter. Thus, the R1 and R3 resources are connected via the R2 resource. In some cases, in particular, if the R1-R2 and R2-R3 connections weight is high enough, this connection is taken into account for determining of indirect, but strong enough connection between the R1 and R3 resources.

Examples shown in FIG. 3*a*-3*c* are provided for the illustrative purposes only.

FIG. 4 depicts a fourth network resource R4, at that, the database 110 stores the information about this fourth network resource R4, and this information includes at least one parameter, in particular, it can be two parameters P45 and P46. The fourth network resource R4 parameter P45 matches the fifth network resource R5 parameter P45, and the fourth network resource R4 parameter P46 matches the sixth network resource R6 parameter P46. Therefore, it is possible to establish connection between the fourth network resource R4 and the fifth network resource R5, and between the fourth network resource R4 and the sixth network resource R6.

Figure 5:
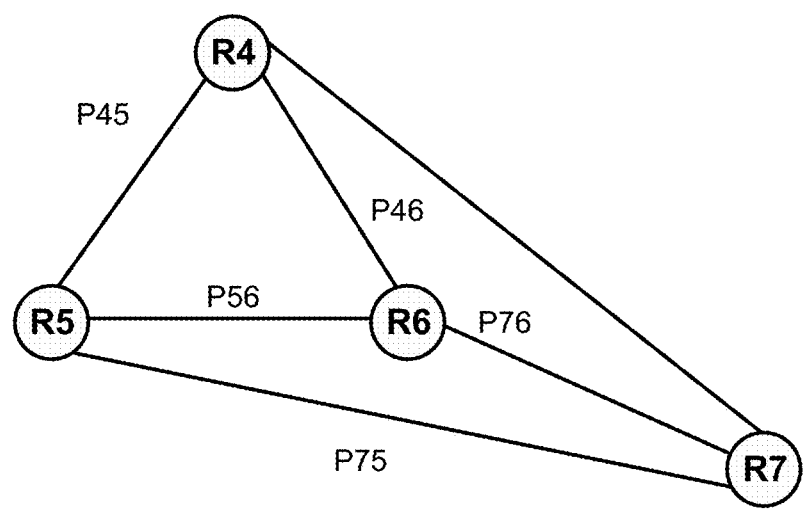
FIG. 5 depicts a graph illustrating network resources connections according to yet further non-limiting embodiment of the present technical solution.

As depicted in FIG. 5 in addition to the fourth network resource R4, a seventh network resource R7 is set. As such, the database 110 stores the information about this seventh network resource R7, and this information includes at least one parameter associated with the seventh network resource R7, in particular, it can be two parameters P75 and P76. The seventh network resource R7 parameter P75 matches the fifth network resource R5 parameter P75, and the seventh network resource R7 parameter P76 matches the sixth network resource R6 parameter P76. Therefore, it is possible to establish a connection between the seventh network resource R7 and the fifth network resource R5, and connection between the seventh network resource R7 and the sixth network resource R6. Based on this connection it is possible to establish connection between the fourth network resource R4 and the seventh network resource R7.

Figure 6:
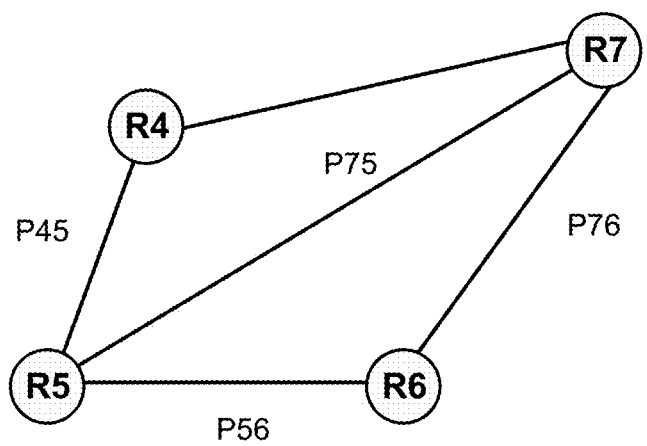
FIG. 6 depicts a graph illustrating network resources connections according to yet another non-limiting embodiment of the present technical solution.

FIG. 6 shows a case, when in addition to the fourth network resource R4 the seventh network resource R7 is provided. At that, the seventh network resource R7 has only one P75 parameter, matching the fifth network resource R5 parameter P75, and matching the sixth network resource R6 parameter P76 parameters are absent and vice versa. In this case, only connections between the seventh network resource R7 and the fifth network resource R5, or between the seventh network resource R7 and the sixth network resource R6 may be established.

Figure 7:
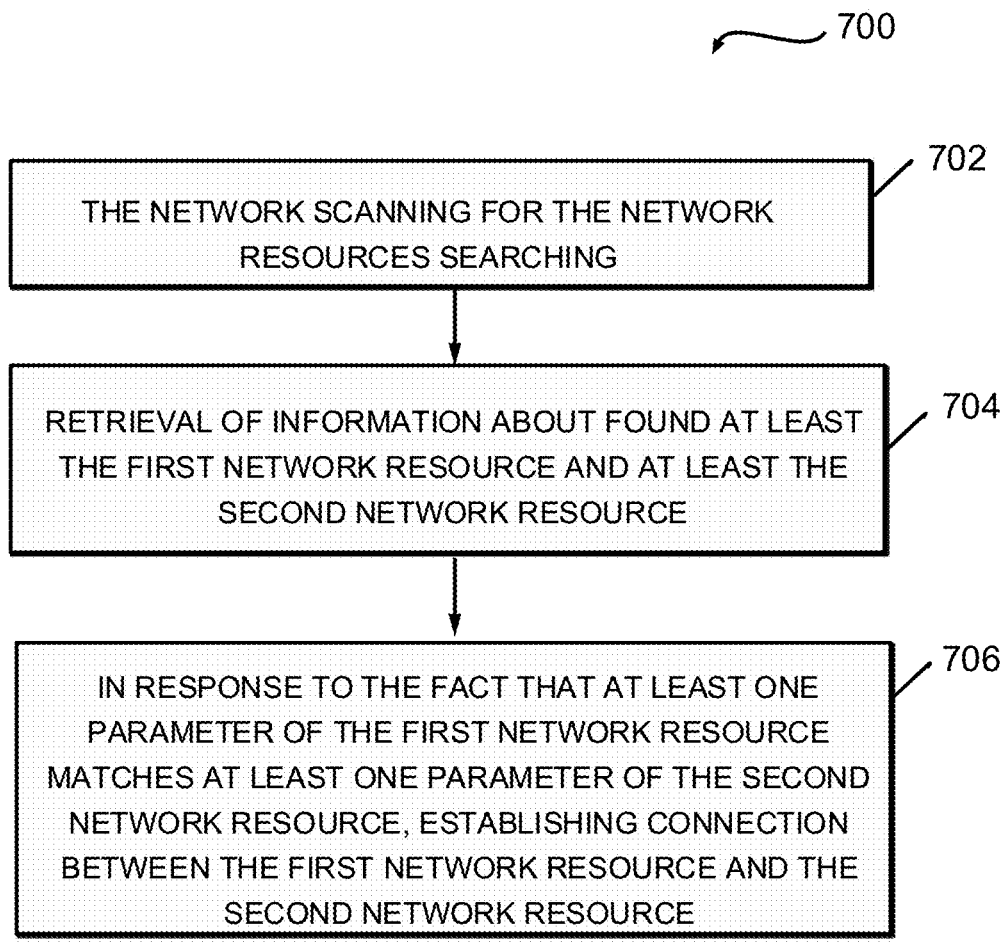
FIG. 7 depicts a flow chart of a method for searching for associated network resources, the method implemented according to a non-limiting embodiment of the present technical solution.

FIG. 7 depicts block diagram of a method 700 of determining associated network resources. The method 700 is implemented by the server 104 in accordance with the non-limiting embodiments of the present technology.

Step 702—the network scanning for the network resources searching.

The method 700 starts at the step 702, where in the server 104 the network scanning is initiated by the web robot 106. Let it be assumed that the network scanning step 702 results in finding at least the first network resource R1 and least the second network resource R2.

In particular, after the network scanning the method 700 makes it possible to establish connections between the network resources by such parameter as the domain name, IP-address, e-mail address, phone number, etc. In some non-limiting embodiments of the method 700, the connection between the network resources is established based on a combination of the matching parameters of the network parameters.

The network scanning comprises the network automatic monitoring by the web robot 106 for identifying the associated network resources. The web robot 106 can receive, from a planner module or an operator, a command containing a set of features associated with the web resource that is deemed to be suspicious. The scanning is performed based on the so-received set of features. The web robot 106 can also receive an indication of an area of the network, for which the scanning is to be performed.

In a non-limiting embodiment of the present technology, at the step 702 the scanning is performed by the domain names and the IP-addresses parameter, but the other appropriate parameters can be used. For example, in one of non-limiting embodiments of the present technology, the network scanning may be performed only by the domain names, and in other non-limiting embodiment the network scanning may be performed only by the IP-addresses.

In particular, the network scanning may be performed by the information about the SSL-certificates, SSH-key fingerprints, running in the network resources servers. The method 700 can also accessing the database 110 containing already identified network resources and update information associated therewith, such as the domain names, as well as to add newly uncovered domain names. In some non-limiting embodiments, the network scanning may be performed repeatedly, after which information about the uncovered network resources is additionally stored into the database 110 in the form of the found network resources history.

At the same time, in one non-limiting embodiments of the present technology, the network scanning may be performed without any limitation of the parameters used, or with a limitation of the number of network resources, which must be found as a result of scanning, for example, one million resources. At that, information about each found resource may be entered into the database 110 and stored therein.

Step 704—retrieval of information about found at least the first network resource and at least the second network resource.

The method continues to step 704, at which the information about found network resources is retrieved. The information includes: at least one parameter of the first network resource R1 and at least one parameter of the second network resource R2.

Information about found network resources may contain IP-address, domain name, SSL-key, SSH-fingerprint, information about running services, domain names history, IP-addresses history, DNS-servers' history, DNS-records changing history, executable files with network nodes interaction history, domain name/IP-address owners' history. For example, if the network scanning was performed by the domain names, then the found domain name may contain, for example, information about the IP-address, SSH-fingerprint.

In one of the non-limiting embodiments of the method 700, information about the domain name may additionally contain the domain name registration data.

In some of non-limiting embodiments of the method 700, the domain name registration data may include the e-mail address, surname, first name and patronymic, date of birth, telephone number, postal address, passport data of the natural person, to which it is registered.

In another non-limiting embodiment of the method 700, the domain name registration data may include the company name, taxpayer identification number (TIN), country, e-mail address, telephone number, legal address, postal address of the legal entity, IP-addresses changing history.

In some of non-limiting embodiments of the method 700, the network resources parameters contains time and date record, information about running services, domain names history, IP-addresses history, DNS-servers' history, DNS-records changing history, executable files with network nodes interaction history, domain name owners' history, IP-address owners' history.

Saving retrieved from the network information about found network resources into the database 110 may additionally be performed. It should be noted that each of found network resources in the database 110 is associated with one of the following parameters: IP-address, domain name, SSL-key, SSH-fingerprint, information about running services, domain names history, IP-addresses history, DNS-servers' history, DNS-records changing history, executable files with network nodes interaction history, domain names/IP-addresses owners' history, domain name owner contact information changing history.

In the non-limiting embodiment, in particular, when information about the network resources is stored in the database 110 in a form of a change log of the network resources parameters, the step 704 can additionally include determining the actual time period for the network resource. For different network resources, the actual time period may differ. In particular, the database 110 stores the information about network resource, to which corresponds the parameter in the form of "domain1.com" domain name, which was registered at Jan. 1, 2015, wherein in the same year its registration period has been expired, and no one else has registered it. After registration, the obtained by this domain name IP-address was the following: 111.111.111.111. When the registration period was expired at Jan. 1, 2016, the registrar has changed its IP-address to the following one: 222.222.222.222. But now this IP-address refers to the "parking" page, in which an offer to buy this domain name with expired validity is published. Thus, in the considered example the actual time period is domain name validity period, i.e., from Jan. 1, 2015 to Jan. 1, 2016. Therefore, the information in the database 110 is deemed to require updating. That is why during the network scanning for the specific network resource the actual time period is taken into account, which may also be increased or reduced. Taking into account the actual time period for the network resource during the scanning, allows ensuring that the IP-address parameter is up to date.

From the above mentioned example it is should be clear that for the different parameters the actual time period definition may differ.

For example, in case when the network resources scanning is performed by the IP-address parameter, the actual time period is the interval, when by this IP-address the domain names were determined, or interval, when the services were started at the given network resource, or interval, when a SSH-key is corresponding to the network resource.

In case, when the network resources scanning is performed by the SSL-certificate parameter, the actual time period is the interval starting from the moment, when the SSL-certificate was detected for the first time, and ending with the moment, when the SSL-certificate was detected for the last time. In case, when the network resources scanning is performed by the SSH-key parameter, the actual time period is the interval, when the SSH-key was detected for the first time, and ending with the moment, when the certificate was detected for the last time.

However, during the scanning performance it is possible to specify the particular period of time, which shall be considered as actual.

During the method implementation according to some of the non-limiting embodiments, the database 110 is used for storing the first and next network scanning information about the network resources, including any parameters of the network resources. For example, the database 110 contains information about the "domain1.com" network resource, including the "e-mail" parameter, which value is the following "my_email_for_domains@mail.com". By the "e-mail" parameter value—"my_email_for_domains@mail.com" at the step 704 it is possible to obtain the network resources, for example, all domain names, which have the same "e-mail" parameter value. Similarly, it is possible to obtain the network resources, which have the same "IP-address', "SSL-certificate", "SSH-key" parameters value, as those, which are present in the database 110. Thus, associated by the "e-mail" parameter network resources are obtained.

Step 706—in response to the fact that at least one parameter of the first network resource matches at least one parameter of the second network resource, establishing connection between the first network resource and the second network resource.

In one of non-limiting embodiments of the present technology in response to the fact that at least one parameter of the first network resource R1 matches at least one parameter of the second network resource R2, the method 700 includes establishing a connection between the first network resource R1 and the second network resource R2.

In some embodiments of the present technology the method 700 then ends.

Additionally, the method 700 may comprise the following actions: at the scanning step 702 additionally finding at least the third network resource R3; at the step 704 of the information retrieval in regard to the found at least the third network resource including at least one parameter of the third network resource R3; additionally in response to the fact that at least one parameter of the first network resource R1 matches at least one parameter of the second network resource R2, and at least one parameter of the second network resource R2 matching at least one parameter of the third network resource R3; determining connection between the first network resource R1 and the third network resource R3. Thus, connection between the first network resource R1 and the third network resource R3 can occur in this example, if connection between them is indirect via the network resource R2.

According to FIG. 3*c* the resource R1 is connected to the resource R2 by the "domain name owner" parameter P3, i.e., the resources R1 and R2 have common domain name owner. The resource R2 is connected to the resource R3 by the "IP-address" parameter P4. Thus, the resources R1 and R3 are connected via the resource R2. In this case, the indirect connection between the resources R1 and R3 will be determined.

Alternatively or additionally, the method 700 may comprise the following actions: additionally obtaining information from the history about found at least the first network resource R1 and at least the second network resource R2; at the connection establishing step uses the information from the history about found at least the first network resource R1 and at least the second network resource R2, including at least one parameter of the first network resource R1 and at least one parameter of the second network resource R2; and the method 700 further includes comparing information from the history with the information retrieved from the database 110 about found at least the first network resource R1 and at least the second network resource R2.

For the purposes of the present disclosure, "at least part of information from the history" may represent one or more records. For example, at least part of the IP-addresses owners' history may contain information about only one IP-address owner, which differs from the said IP-address current owner.

In some non-limiting embodiments of the method 700, part of the network resources parameters may contain at least one parameter of the network resource.

For the purposes of the present disclosure, unless specifically indicated otherwise, the retrieved information may mean at least the following: domain name, IP-address, SSL-key, SSH-fingerprint, information about running services, domain names history, IP-addresses history, DNS-servers history, DNS-records changing history, executable files with network nodes interaction history, domain name owners' history, IP-address owners' history.

For the purposes of the present disclosure, the record means information associated with the time and date. In the non-restrictive illustrative example, the record may be surname of the natural person, who owns the domain name in the specified time.

At the step 706, the method 700 may further include evaluating the number of network resources associated by the network resource common parameter. If in some specified period of time the network resource R1 IP-address is connected by such number of network resources R2-Rn, which exceeds some preset threshold number of network resources TR, then in this case the connections between the network resource R1 and network resources R2-Rn by this parameter can be ignored. Assume that for the IP-address parameter is set to two hundreds as a threshold number of network resources, i.e. TR=200. At the same time, assume that more than five thousand resources associated by this parameter are found during the scanning, i.e. TR<5,000. This may mean that the server is the shared hosting used by many users at once. Such connections between the network resources may be not informative enough, that is, it may happen that between the network resources connection only by one such parameter exists, and there are no connections by other common for the network resources parameters. If there is a connection between the network resources by more than one parameter, and the number of common parameters for the network resources is comparatively large, then connection between the network resources is tighter.

The same applies mutatis mutandis for the "e-mail" parameter. If the associated e-mail address of the network resource is connected to such a number of the network resources, which exceeds some preset network resources threshold number TR, this may mean that these network resources belong to the registrar or the intermediary between the registrar and the buyer. Assume that two hundreds is a threshold number of network resources is preset for this parameter, i.e. TR=200, at that, more than ten thousand associated by this parameter network resources is found during scanning, i.e. TR<10,000.

The same applies mutatis mutandis for the "SSH-key" parameter. If a particular SSH-key is found on such number of network resources, which exceeds preset threshold number of network resources TR, this may mean that they are cloned network resources. Assume that two hundreds threshold is a number of network resources is preset for this parameter, i.e. TR=200, at that, more than five hundred thousand associated by this parameter network resources is found during scanning, i.e. TR<500,000.

If the considered connections are found between the network resources, then they can be ignored. For example, if connected by the common parameter network resources some threshold number TR is set, then in case of this network resources threshold number TR exceeding, this common for them parameter can be ignored.

In addition, in the disclosed method the steps 702-706 can be executed in a loop. In other words, these steps may be performed repetitively, wherein the more iterations are executed, the more connections may be found between the network resources. In this case, if during the first scanning for the network resources a common parameter is found, exceeding the network resources threshold number TR, its usage in the subsequent iterations is not reasonable, since it may lead to determining of the "false" connections between the network resources.

Additionally, the method 700 may include combining all the associated network resources and representing the combined network resources by means of a mathematical model in a form of a graph. The graph generating means establishing connections between the network resources, wherein during the graph generation, each of the parameters of the network resource is associated with the actual time period. For example, the database 110 contains information on that the IP-address 111.111.111.111 is associated with the network resource having a name "domain1.com", then to this network resource "IP-address" parameter the actual time period is applied, for example, Jan. 1, 2017-Jan. 1, 2018, corresponding to the current period of time, to which the actual network resource owners are corresponding.

According to the non-limiting embodiments of the present technology, during the graph generation an additional evaluation of the associated network resources may be performed in order to determine a number of the network resources associated with found network resource network resources by the common parameter and compare it to a preset threshold number TR. Those connections that are above the preset threshold number TR may be ignored in at least some non-limiting embodiments of the present technology.

Next, the graph generation may include determining a connection factor K as a ratio of (i) a number of connections by one parameter between one first network resource and the second network resources, and (ii) each connection weight by one parameter between the first network resource and the second network resources. Then, depending on the connection factor K, connections between at least the first network resource R1 and the at least the second network resource R2 can be ignored. In one non-limiting embodiment of the disclosed method a "bunch" of connections having the smallest factor may be ignored. As the non-limiting embodiment the threshold value T may be set as the two decimal places or as the thousandths; and if the connection factor K is less than the threshold value T, then connections between one resource and plurality of resources can be ignored.

Thus, in the non-limiting embodiment, connections deletions between the network resources take place several times: using the network resources threshold number TR, as well as using the connection factor K, wherein with the connection factor K usage of only those connections are taken into account, which are left after the connections deletion using the network resources threshold number TR.

According to FIG. 3*b* in the graph 300 connections between the resource X and the resources Y1-Y100 by the parameter P21 are presented in large number, wherein the parameter weight w=3, and thus, the connection factor K makes 0.03, and the threshold value T=0.05, K<T. Connections between the network resources, at which the connection factor is smaller than the threshold value is considered as the "weak" connections. Therefore, it is reasonable to ignore, in other words, cut off, connections between the resource X and the resources Y1-Y100, as the "weak" connection. Due to this, the computation time reduction and the computational resources saving can be provided for.

Among the "weak" connections there also may be connections established on the basis of the network resources parameters, which may be false. In particular, such connections include the network resource registration data, the SSL-certificate data. Wherein for different network resources a set of parameters exists, which are possible and impossible to falsify. The "strong" connections are connections by such network resources parameters, which are impossible to falsify. In the non-restrictive embodiment of the present technical solution it is accepted that the bigger weight is assigned to the connection, the "stronger" the connection, and vice versa, the smaller weight is assigned to the connection, the "weaker" it is.

Figure 9:
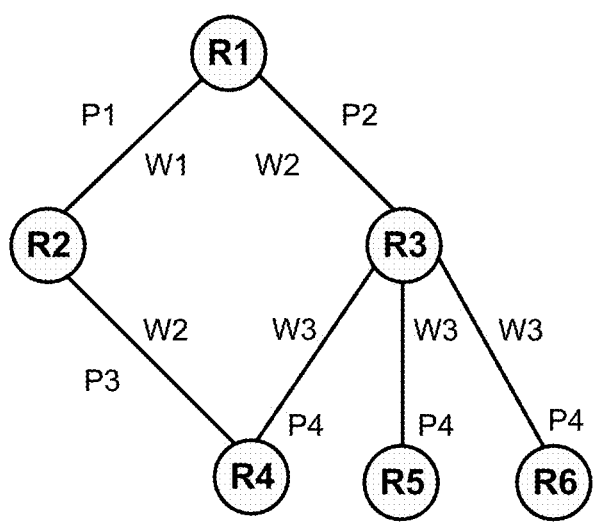
FIG. 9 depicts a graph illustrating network resources connections according to yet another non-limiting embodiment of the present technical solution.
Figure 10:
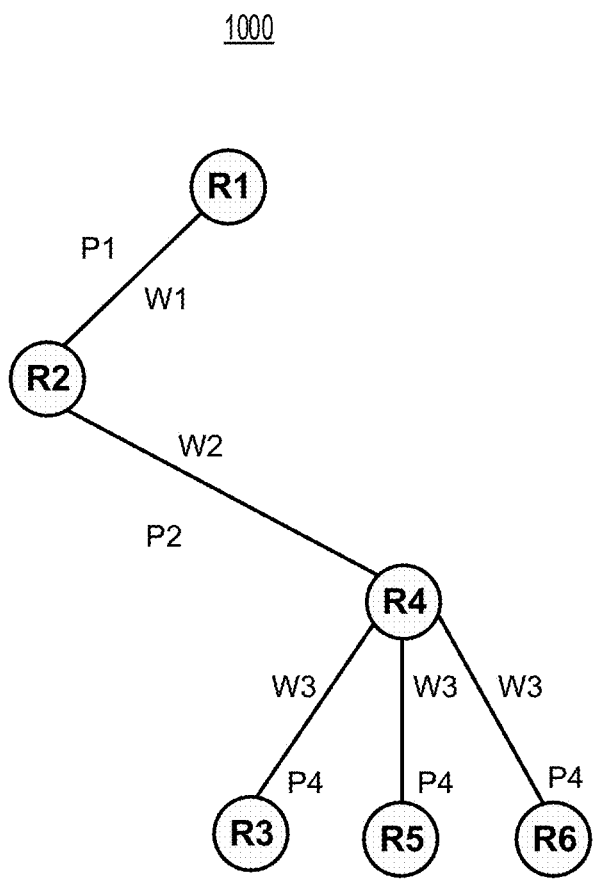
FIG. 10 depicts a graph illustrating network resources connections according to yet further non-limiting embodiment of the present technical solution.

In FIGS. 9 and 10 a case is depicted, in which it is reasonable to ignore connections between the network resources during the mathematical model in the form of graph usage.

According to the FIG. 9 in the graph connections between the network resources R1, R2, R3, R4, R5 and R6 are shown using the mathematical model in the form of a graph 900. The network resources are designated as R1, R2, R3, R4, R5 and R6, and represented as the graph vertices, and connections between the resources R1, R2, R3, R4, R5 and R6 are represented by the graph edges R1-R2, R1-R3, R2-R4, R3-R4, R3-R5, R3-R6.

Between the network resource R1 and the network resource R2 there is a connection by the "e-mail" parameter P1, based on which the connection is assigned with weight w1=11; between the network resource R1 and the network resource R3 there is a connection by the "domain name" parameter P2, based on which the connection is assigned with weight w2=3; between the network resource R3 and the network resources R4, R5, R6 there is a connection by the "domain name" parameter P4, which is assigned with weight w3=10; the network resource R2 is connected to the network resource R4 by the "ns-server" parameter P3, based on which the connection is assigned with weight w2=3. The weights w1 and w3 values are significantly exceed the weight w2 values, thus, connections between the network resources R1 and R2; R3 and R4; R3 and R5; R3 and R6 are "strong". The weight w2 is the smallest one, thus, connection between the network resources R1 and R3 is the "weak" connection, and may be deleted from the graph.

In FIG. 10 a graph 1000 is depicted, at which the edge R1-R3 is absent, but the edge R2-R4 remains. Connection between the network resources R2 and R4 remains, but it is also a "weak" connection based on the "ns-server" parameter P3, by which this connection is assigned with weight w2=3.

Next, after the R1-R3 edge connection between the network resources is deleted from the graph, reevaluation of connections between the network resources may be performed. With such reevaluation the connection between the network resources R2 and R4, that is, the edge R2-R4, may also be deleted from the graph, since the edge R2-R4 has small weight, and connected to the R4 the remaining graphs R3-R4, R5-R4, R6-R4 have large weight. The connections reevaluation represents the remaining connections review, which are "strong" and which are "weak". Thus, on the graph only the edge R1-R2 remains, since the network resource R1 and the network resource R2 have connection by the "e-mail" parameter P1, based on which the connection is assigned with the maximum weight w1=11. As a result of the R2-R4 deletion, the network resources complex R3, R4, R5 and R6 is found completely deleted from the graph, despite the fact that connecting these network resources weight w3 is significantly exceeds the weight w2.

By the network resources complex R3, R4, R5 and R6 a separate graph may be generated, in which connections between the network resources R3, R4, R5 and R6 and other associated with them network resources are established. Supposing all connections on the graph as having approximately the same weight, they could be left and taking into consideration when performing the analysis in accordance with the methods disclosed herein.

According to another non-limiting embodiment, a method 800 can be executed, taking into account already known network resource, for example, the fourth network resource. For the method 800 all additional steps and cases set forth relative to the method 700 are also applicable mutatis mutandis.

Figure 8:
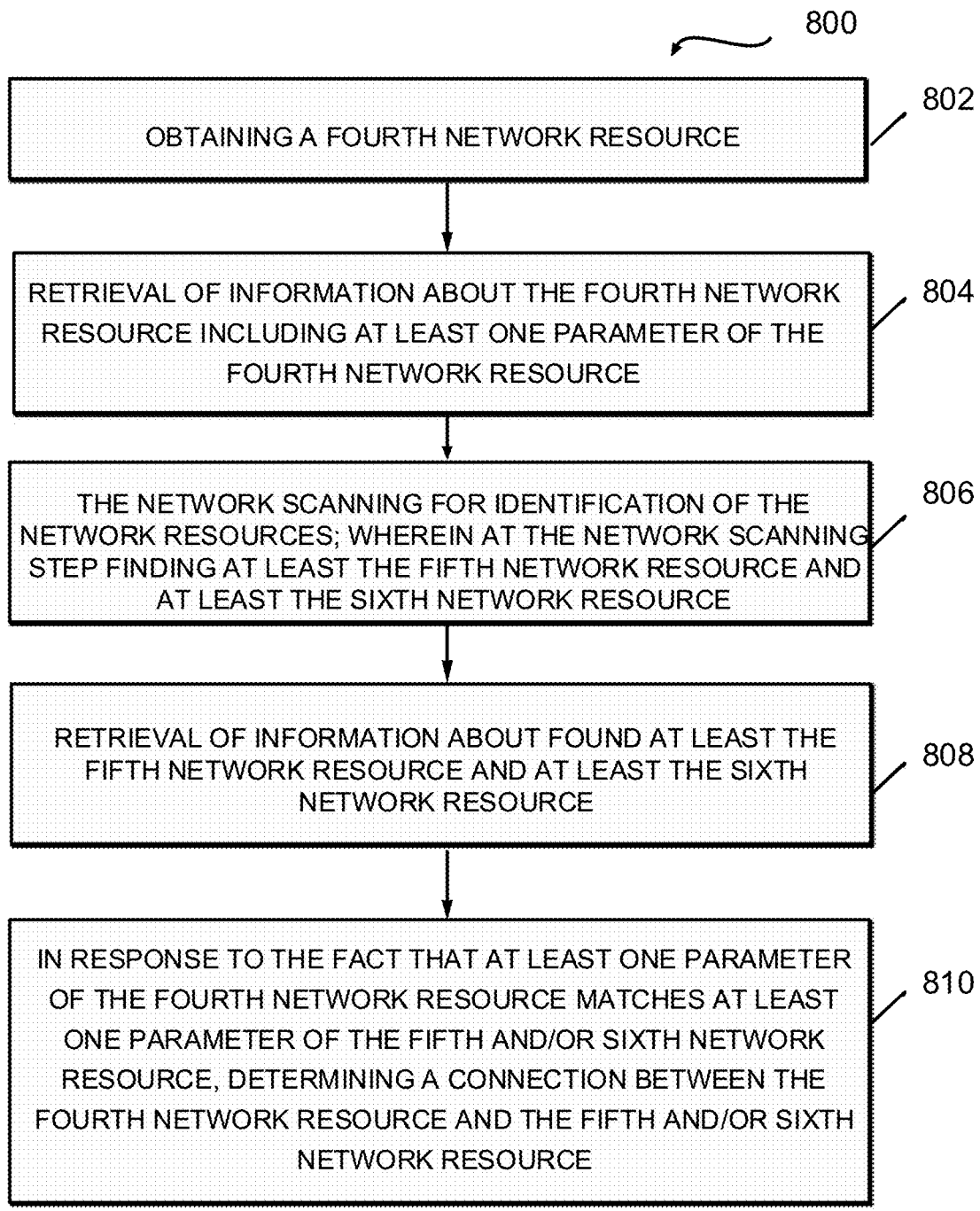
FIG. 8 depicts a flow chart of a method for searching for associated network resources, the method implemented according to yet another non-limiting embodiment of the present technical solution.

According to the FIG. 8, the method 800 comprises the following steps:

Step 802—obtaining a fourth network resource.

The method 800 starts at the step 802, when obtaining the fourth network resource R4 is executed. The fourth network resource R4 is the one relative to which scanning the network for the associated thereto network resources is to be performed.

In some non-limiting embodiments of the present technology at least one specified network resource is set by the user. The specified network resource may represent a resource, which is interesting from the point of view of the associated thereto network resources searching. For example, in the method 800 a news resource may be specified for its connections determination to other news resources, or to the blogs, online-shops, advertisement providers.

Step 804—retrieval of information about the fourth network resource including at least one parameter of the fourth network resource.

In general, the step 804 is similar to the step 704 of the method 700. Information is retrieved from the fourth network resource R4, wherein information includes at least one parameter of the fourth network resource R4, in particular, it may be two parameters P45 and P46.

Information about found network resources may contain IP-address, domain name, SSL-key, SSH-fingerprint, information about running services, domain names history, IP-addresses history, DNS-servers' history, DNS-records changing history, executable files with network nodes interaction history, domain name/IP-address owners' history. For example, if the network scanning was performed by the domain names, then the found domain name may contain, for example, information about the IP-address, SSH-fingerprint.

In one of the non-limiting embodiments of the method 700, information about the domain name may additionally contain the domain name registration data.

In one of the non-limiting embodiments of the method 700, the domain name registration data may include the e-mail address, surname, first name and patronymic, date of birth, telephone number, postal address, passport data of the natural person, to which it is registered. In another non-limiting embodiment of the method 700, the domain name registration data may include the company name, taxpayer identification number (TIN), country, e-mail address, telephone number, legal address, the legal entity postal address.

In one of the non-limiting embodiments of the method 700, at least part of the network resources parameters contains at least one parameter associated with the time and date record, yet another part of the parameters contains at least one of the following parameters: information about running services, domain names history, IP-addresses history, DNS-servers' history, DNS-records changing history, executable files with network nodes interaction history, domain name owners' history, IP-address owners history.

Saving information about found network resources into the database 110 may additionally be performed. Each of found network resources in the database 110 is associated with one of the following parameters: IP-address, domain name, SSL-key, SSH-fingerprint, information about running services, domain names history, IP-addresses history, DNS-servers' history, DNS-records changes, executable files with network nodes interaction history, domain name/IP-address owners' history.

Step 806—the network scanning for identification of the network resources; wherein at the network scanning step finding at least the fifth network resource and at least the sixth network resource.

In general, the step 806 is similar to the step 702 of the method 700. Step 806 may result in finding at least the fifth network resource R5 and at least the sixth network resource R6.

Step 808—retrieval of information about found at least the fifth network resource and at least the sixth network resource.

The method continues to step 808, which is, in general, is similar to the step 704 of the method 700. At that, information, including at least one parameter of the fifth network resource R5, for example, parameter P45, and at least one parameter of the sixth network resource R6, for example, parameter P46.

Step 810—in response to the fact that at least one parameter of the fourth network resource matches at least one parameter of the fifth and/or sixth network resource, determining a connection between the fourth network resource and the fifth and/or sixth network resource.

The method continues to step 808, which is, in general, is similar to the step 706 of the method 700. In one of non-limiting embodiments of the present technology, in response to the fact that at least one parameter P46 of the fourth network resource R4 matches at least one parameter P46 of the sixth network resource R6 and/or at least one parameter of the fifth network resource R5, the method 800 includes establishing a connection between the fourth network resource R4 and the fifth network resource R6 and/or sixth network resource R5.

According to the FIG. 4 the fourth network resource R4 is preset, at that, the database 110 stores the information about this preset fourth network resource R4, and this information includes at least one parameter of the fourth network resource R4, in particular, it can be two parameters P45 and P46. The fourth network resource R4 parameter P45 matches the fifth network resource R5 parameter P45, and the fourth network resource R4 parameter P46 matches the sixth network resource R6 parameter P46. Therefore, it is possible to establish connection between the fourth network resource R4 and the fifth network resource R5, and between the fourth network resource R4 and the sixth network resource R6.

The case is possible, when the fourth network resource R4 has only one parameter P45, matching the fifth network resource R5 parameter P45, and matching the sixth network resource R6 parameter P46 parameters are absent and vice versa. In this case, only connections between the fourth network resource R4 and the fifth network resource R5, or between the fourth network resource R4 and the sixth network resource R6 may be determined.

In addition, in response to the fact that at least one parameter P56 of the fifth network resource R5 matches at least one parameter P56 of the sixth network resource R6, the method 800 comprises determining of connection between the fifth network resource R5 and the sixth network resource R6, which is also reflected in FIG. 4.

Additionally, the method 800 comprises the following actions: additionally obtaining a seventh network resource R7, similarly to the step 802; similarly to the step 804 retrieving information about the seventh network resource R7, including at least one parameter, in particular, the seventh network resource R7 two parameters P75 and P76; the network scanning in order to search for the network resources similarly to the step 806; wherein at the network scanning step finding at least the fifth network resource R5 and at least the sixth network resource R6.

Next, in response to the fact that at least one parameter of the seventh network resource matches at least one parameter of the fifth and/or the sixth network resource, establishing connection between the seventh network resource and the fifth and/or sixth network resource.

According to the FIG. 5, when in addition to the fourth network resource R4 the seventh network resource R7 is set, at that, the database 110 stores the information about this set seventh network resource R7, and this information includes at least one parameter of the seventh network resource R7, in particular, it can be two parameters P75 and P76. The seventh network resource R7 parameter P75 matches the fifth network resource R5 parameter P75, and the seventh network resource R7 parameter P76 matches the sixth network resource R6 parameter P76. Therefore, it is possible to establish connection between the seventh network resource R7 and the fifth network resource R5, and connection between the seventh network resource R7 and the sixth network resource R6. Based on this connection it is possible to establish connection between the fourth network resource R4 and the seventh network resource R7.

According to FIG. 6 a case is depicted, when in addition to the fourth network resource R4 the seventh network resource R7 is set. At that, the seventh network resource R7 has only one parameter P75, matching the fifth network resource R5 parameter P75, and matching the sixth network resource R6 parameter P76 parameters are absent and vice versa. In this case, only connections between the seventh network resource R7 and the fifth network resource R5, or between the seventh network resource R7 and the sixth network resource R6 may be established.

In case, if there is a connection between the fifth network resource R5 and the sixth network resource R6 by the parameter P56, which also reflected both in FIG. 4 and in FIG. 5, then it is possible to establish connection between the fourth network resource R4 and the seventh network resource R7.

In one of non-limiting embodiments of the present technology, the information about at least one network resource at the steps 704 or 804 may be obtained from the user. The user may report information about the specified resource in the form of at least one of the following parameters: domain name designation, IP-address, SSL-key, SSH-fingerprint, information about running services, domain names history, IP-addresses history, DNS-servers' history, DNS-records changing, executable files with network nodes interaction history, domain name owners' history, IP-address owners' history.

In another non-limiting embodiment of the present technology, the information about at least one network resource A at the steps 704 or 804 may be retrieved from the database 110. Information about the network resource A may be retrieved from the database 110 in the form of at least one of the following parameters: domain name designation, IP-address, SSL-key, SSH-fingerprint, information about running services, domain names history, IP-addresses history, DNS-servers' history, DNS-records changing, executable files with network nodes interaction history, domain name owners' history, IP-address owners' history.

In one of non-limiting embodiments of the present technology, the information about at least one network resource may additionally contain the domain name registration data.

In one of non-limiting embodiments of the present technology, the connection weight determination is based on the matching parameters number and weight. For the purposes of the present disclosure, the parameter means some property of the network resource, which may be obtained or determined separately from the said network resource other properties, property, which is characteristic to at least part of the network resources.

In yet another non-limiting embodiment of the present technology, the connection weight determination may be additionally based on the domain name registration data.

For the purposes of the present disclosure, the weight means value assigned to the given connection (in other words, to the graph edge), allowing the network resource parameters ordering.

As the non-limiting embodiment of the present technology the following examples may be given. In the first example, at the specified network resource 302 SSH-fingerprints matching with one of plurality of network resources 304 known IP-address and domain name with the SSH-fingerprint is observed. In the second example, at the specified network resource 302 with the said one of plurality of network resources 304 partial matching in the domain names owners' histories is found, related to the said specified server, and one of plurality of the network resources 304, wherein the owners do not match with the said domain names current owners, and had rights for the said domain names at different time.

At that, formed in the first case connection between the network resources usually has larger weight, than formed in the second case connection between the network resources.

Alterations and improvements of the above mentioned embodiments of the present technique will be clear to those skilled in the art. The foregoing disclosure is presented only as an example and do not set any limitations. Thus, the present technique scope is limited only by the scope of the appended claim.

The invention claimed is:

1. A method of determining affiliation of network resources with a malicious infrastructure on a network, the method being executable by a server that is communicatively coupled to the network, the method comprising:
scanning, by the server, the network to identify a plurality of network resources;
retrieving, by the server, information associated with each one of the plurality of network resources, the information associated with a given one of the plurality of network resources comprising at least one respective parameter thereof;

identifying, by the server, in the plurality of network resources, based on the information associated with each one of the plurality of network resources, network resources having respective parameters matching the at least one respective parameter of the given one of the plurality of network resources, thereby generating network resources,
the first subset of network resources potentially being affiliated with a respective malicious infrastructure;
determining, by the server, a number of network resources in the first subset of network resources;
calculating, based on the number of resources in the first subset of network resources, for the at least one respective parameter, a first connection weight,
the first connection weight being indicative of a quality value associated with the at least one respective parameter being an unambiguously characterizing indicator of the network resources having been grouped into the first subset of network resources by the at least one respective parameter being affiliated with the respective malicious infrastructure;
the first connection weight associated with the at least one respective parameter being inversely proportional to the number of network resources in the first subset of network resources, such that:
the fewer the number of network resources in the first subset of network resources is, the greater the first connection weight is;
in response to the first connection weight being greater than or equal to a predetermined threshold value:
identifying, based on the at least one respective parameter, the first subset of network resources as being affiliated with the respective malicious infrastructure in the network;
storing, by the server, data indicative of the at least one respective parameter in a database of network resources; and
using, by the server, the data indicative of the at least one respective parameter for analyzing other network resources on the network for affiliation thereof with an other malicious infrastructure.

2. The method of claim 1, wherein the method further comprises evaluating an actual time interval as the at least one respective parameter.

3. The method of claim 1, wherein the method further comprises:
obtaining additional information associated with the given one of the plurality of network resources from a history database; and wherein
the matching between the at least one respective parameter of the given one of the plurality of network resources and the respective parameters of each one of the first subset of network resources is established based on the additional information from the history database.

4. The method of claim 1, wherein the at least one respective parameter comprises at least one of:
a domain name,
an IP-address,
an SSL-key,
an SSH-fingerprint,
an executable file,
information about running services,
a domain name owner data,
an IP-address owner data,
an e-mail address, and
resource owner contact information.

5. The method of claim 1, wherein the at least one respective parameter has at least one value.

6. The method of claim 1, further comprising determining respective connections among the first subset of network resources, based on the at least one respective parameter, by applying a mathematical model in a form of a graph, graph vertices respectively corresponding to each one of the first subset of network resources, and graph edges representing the respective connections thereamong.

7. The method of claim 1, wherein the predetermined threshold value is set by the user.

8. The method of claim 1, wherein the predetermined threshold value is set using a machine learning algorithm.

9. The method of claim 1, wherein the first connection weight is further based on a date and time associated with at least part of the information associated with each one of the plurality of network resources.

10. The method of claim 1, wherein the at least one respective parameter is associated with a first parameter weight, and the first connection weight is directly proportional to the first parameter weight.

11. A server for determining affiliation of network resources with a malicious infrastructure on a network, the server being configured to connect to a database via the network, the server comprising:
a data transmission interface for data exchange via the network;
a memory storing machine-readable instructions;
a processor, functionally coupled to the data transmission interface and the memory, wherein the processor, upon executing the machine-readable instructions, being configured to:
scan the network to identify a plurality of network resources;
retrieve information associated with each one of the plurality of network resources, the information associated with a given one of the plurality of network resources comprising at least one respective parameter thereof;
identify, in the plurality of network resources, based on the information associated with each one of the plurality of network resources, network resources having respective parameters matching the at least one respective parameter of the given one of the plurality of network resources, thereby generating network resources,
the first subset of network resources potentially being affiliated with a respective malicious infrastructure;
determine a number of network resources in the first subset of network resources;
calculate, based on the number of resources in the first subset of network resources, for the at least one respective parameter, a first connection weight,
the first connection weight being indicative of a quality value associated with the at least one respective parameter being an unambiguously characterizing indicator of the network resources having been grouped into the first subset of network resources by the at least one respective parameter being affiliated with the respective malicious infrastructure;
the first connection weight associated with the at least one respective parameter being inversely proportional to the number of network resources in the first subset of network resources, such that:

the fewer the number of network resources in the first subset of network resources is, the greater the first connection weight is;
in response to the first connection weight being greater than or equal to a predetermined threshold value:
identify, based on the at least one respective parameter, the first subset of network resources as being affiliated with the respective malicious infrastructure in the network;
store data indicative of the at least one respective parameter in a database of network resources; and
use the data indicative of the at least one respective parameter for analyzing other network resources on the network for affiliation thereof with an other malicious infrastructure;
in response to the first connection weight being less than the predetermined threshold value, not identify the first subset of network resources as being affiliated with the respective malicious infrastructure.

12. The method of claim 1, wherein, in response to the first connection weight being less than the predetermined threshold value, the method further comprises not identifying, based on the at least one respective parameter, the first subset of network resources as being affiliated with the respective malicious infrastructure.

* * * * *

UNITED STATES PATENT AND TRADEMARK OFFICE
CERTIFICATE OF CORRECTION

PATENT NO. : 11,005,779 B2  
APPLICATION NO. : 16/270341  
DATED : May 11, 2021  
INVENTOR(S) : Dmitry Aleksandrovich Volkov et al.

Page 1 of 1

It is certified that error appears in the above-identified patent and that said Letters Patent is hereby corrected as shown below:

In the Claims

Column 23, Claim 1, Lines 6 and 7 should read --thereby generating a first subset of network resources--
Column 24, Claim 11, Lines 46 and 47 should read --thereby generating a first subset of network resources--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*